(12) United States Patent
Ogino et al.

(10) Patent No.: US 11,754,178 B2
(45) Date of Patent: Sep. 12, 2023

(54) SHIFT DEVICE

(71) Applicant: AISIN CORPORATION, Kariya (JP)

(72) Inventors: Atsuto Ogino, Kariya (JP); Kota Ishikawa, Kariya (JP); Yutaka Uchida, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/655,856

(22) Filed: Mar. 22, 2022

(65) Prior Publication Data

US 2022/0333686 A1 Oct. 20, 2022

(30) Foreign Application Priority Data

Apr. 16, 2021 (JP) .................. 2021-069682

(51) Int. Cl.
*F16H 61/32* (2006.01)
*F16H 59/08* (2006.01)
*F16H 61/24* (2006.01)

(52) U.S. Cl.
CPC ............ *F16H 61/32* (2013.01); *F16H 59/08* (2013.01); *F16H 61/24* (2013.01); *F16H 2061/247* (2013.01); *F16H 2061/326* (2013.01)

(58) Field of Classification Search
CPC ......... F16H 2061/326; F16H 2061/247; F16H 61/24; F16H 59/08; F16H 61/32
See application file for complete search history.

(56) References Cited

U.S. PATENT DOCUMENTS

| | | | |
|---|---|---|---|
| 6,230,576 B1 | 5/2001 | Yamada et al. | |
| 2009/0000411 A1 | 1/2009 | Nakayama et al. | |
| 2015/0142283 A1* | 5/2015 | Ono | F16H 61/12 701/60 |
| 2019/0264805 A1* | 8/2019 | Kamio | F16H 61/28 |
| 2020/0400232 A1* | 12/2020 | Sakaguchi | F16H 61/2807 |
| 2022/0145986 A1* | 5/2022 | Ishiura | F16H 57/12 |
| 2022/0221050 A1* | 7/2022 | Miyano | F16H 61/32 |
| 2022/0268357 A1* | 8/2022 | Choi | F16H 61/32 |
| 2022/0307592 A1* | 9/2022 | Ogino | F16H 61/2807 |
| 2022/0307594 A1* | 9/2022 | Ogino | F16H 61/32 |
| 2022/0333684 A1* | 10/2022 | Kang | F16H 61/12 |
| 2022/0333686 A1* | 10/2022 | Ogino | F16H 61/24 |
| 2022/0360207 A1* | 11/2022 | Sakaguchi | H02P 29/0243 |

FOREIGN PATENT DOCUMENTS

| | | |
|---|---|---|
| DE | 11 2018 001 011 T5 | 11/2019 |
| JP | 2009-8153 A | 1/2009 |

* cited by examiner

*Primary Examiner* — David M Fenstermacher
(74) *Attorney, Agent, or Firm* — Oblon, McClelland, Maier & Neustadt, L.L.P.

(57) ABSTRACT

A shift device includes a shift switching member including a plurality of valley portions corresponding to shift positions, a motor including a rotor and a stator and configured to drive the shift switching member, a first drive system including a first inverter configured to output a voltage for driving the motor, a second drive system provided separately from the first drive system and including a second inverter configured to output a voltage for driving the motor; and a positioning member configured to be fitted into any one of the plurality of valley portions of the shift switching member to establish the corresponding shift position. When driving the motor, the shift position is switched by the voltages output from the first drive system and the second drive system.

11 Claims, 9 Drawing Sheets

FIG.5
DRIVING FORCE TRANSMITTABLE STATE

FIG.6
DRIVING FORCE NON-TRANSMISSION STATE

FIG.11
EXAMPLE OF ENERGIZATION PATTERN DURING DRIVING

FIG.15
SHIFT SWITCHING PROCESS

FIG.16
SHIFT SWITCHING PROCESS

SHIFT DEVICE

CROSS REFERENCE TO RELATED APPLICATIONS

This application is based on and claims priority under 35 U.S.C. § 119 to Japanese Patent Application 2021-069682, filed on Apr. 16, 2021, the entire content of which is incorporated herein by reference.

TECHNICAL FIELD

This disclosure relates to a shift device, and more particularly to a shift device provided with a shift switching member including a plurality of valley portions.

BACKGROUND DISCUSSION

A shift device provided with a shift switching member including a plurality of valley portions has been known in the related art (see, for example, JP 2009-8153A (Reference 1)).

Reference 1 discloses a shift range switching device provided with a shift switching member including a plurality of valley portions. The shift range switching device includes a motor, a detent plate, a detent spring, a first switching element, a first system, a second switching element, a second system, and a control unit. The detent plate is a shift switching unit that is driven by the motor to switch a shift range (a P position, an N position, an R position, and a D position). The detent spring fixes the shift range of the detent plate.

The control unit of Reference 1 performs control of switching an energized state of coils U1, V1, and W1 of the first system by switching on/off of the first switching element. The control unit performs control of switching an energized state of coils U2, V2, and W2 of the second system by switching on/off of the second switching element. In this way, in the shift range switching device, the motor can be driven only by controlling the energization of the coils U1, V1, and W1 of the first system, or only by controlling the energization of the coils U2, V2, and W2 of the second system. The control unit performs control of driving the motor while energizing only the coils U1, V1, and W1 of the first system and stopping the energization of the coils U2, V2, and W2 of the second system during a normal operation.

Here, in the shift range switching device of Reference 1, even if the first system becomes abnormal at the time of shift switching, the drive control of the motor can be continued by using the second system.

However, although it is not specified in Reference 1, in the shift range switching device of Reference 1, it is considered necessary for the control unit to shift the drive control of the motor to the second system after taking measures (fail-safe) such as stopping the motor, based on detection of an abnormality in the first system at the time of the shift switching. In such a case, the drive control of the motor by the control unit is intermittently executed since the drive control after the above-mentioned measures are taken is shifted. Therefore, it is considered that, in the shift range switching device of Reference 1, it may be difficult to smoothly execute the drive control of the motor when an abnormality is detected at the time of the shift switching.

A need thus exists for a shift device which is not susceptible to the drawback mentioned above.

SUMMARY

A shift device according to one aspect of the disclosure includes: a shift switching member including a plurality of valley portions corresponding to shift positions; a motor including a rotor and a stator and configured to drive the shift switching member; a first drive system including a first inverter configured to output a voltage for driving the motor; a second drive system provided separately from the first drive system and including a second inverter configured to output a voltage for driving the motor; and a positioning member configured to be fitted into any one of the plurality of valley portions of the shift switching member to establish the corresponding shift position. When driving the motor, the shift position is switched by the voltages output from the first drive system and the second drive system.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

A configuration of a shift device 100 will be described with reference to FIGS. 1 to 14. In the description of the present application, "motor rotation angle" and "rotor rotation angle" have the same meaning.

Figure 1:
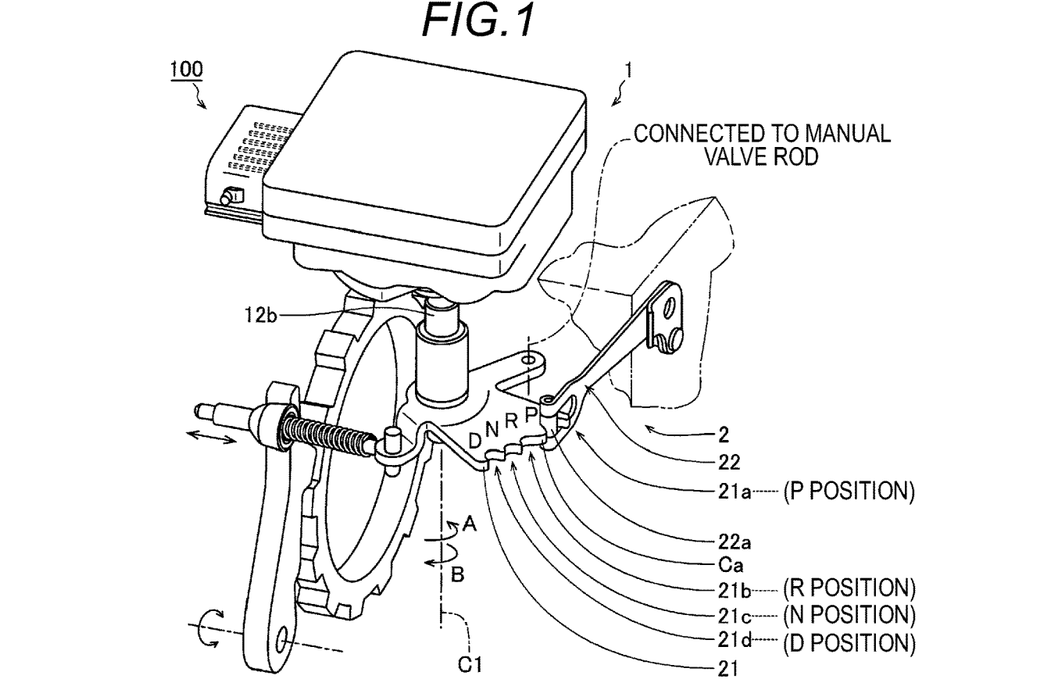
FIG. 1 is a perspective view schematically showing an overall configuration of a shift device according to the present embodiment.

The shift device 100 is mounted on a vehicle such as an automobile. As shown in FIG. 1, when an occupant (driver) performs a shift switching operation via an operation unit such as a shift lever (or a shift switch), a transmission mechanism is subjected to electrical shift switching control in the vehicle. That is, a position of the shift lever is input to a shift device 100 side via a shift sensor provided in the operation unit. Then, based on control signals transmitted from a dedicated first micro controller unit (MCU) 171 (see FIG. 7) and a second MCU 181 (see FIG. 7), which will be described later, provided in the shift device 100, the transmission mechanism is switched to any one of shift positions of a parking (P) position, a reverse (R) position, a neutral (N) position, and a drive (D) position corresponding to a shift operation of the occupant. Such shift switching control is called shift-by-wire (SBW).

The shift device 100 includes an actuator unit 1 and a shift switching mechanism 2 driven by the actuator unit 1. The shift switching mechanism 2 is mechanically connected to a manual spool valve (not shown) of a hydraulic valve body in a hydraulic control circuit unit (not shown) and a parking mechanism in the transmission mechanism. Further, a shift state (the P position, the R position, the N position, and the D position) of a transmission is mechanically switched by driving the shift switching mechanism 2.

Figure 7:
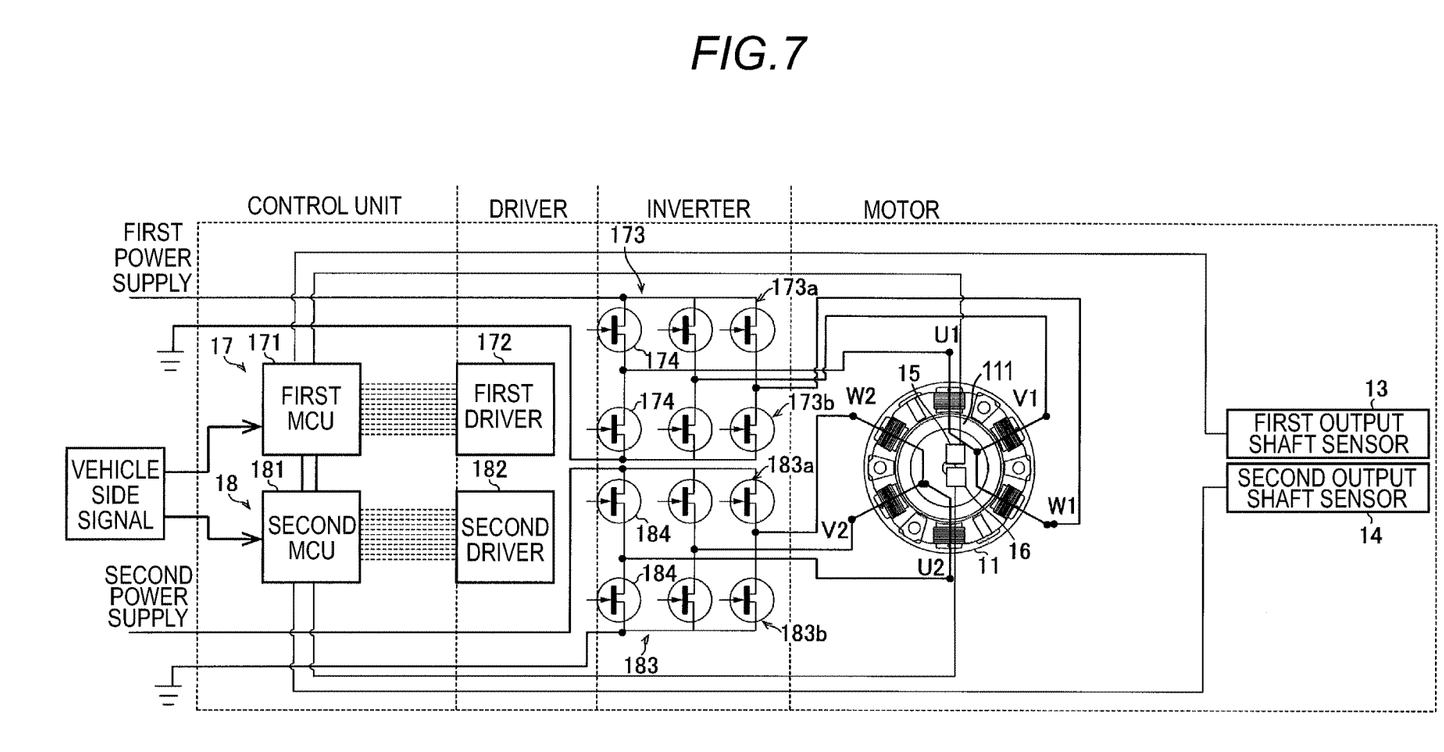
FIG. 7 is a block diagram showing a first drive system and a second drive system according to the present embodiment.

The actuator unit 1 includes a motor 11, a driving force transmission mechanism 12, a first output shaft sensor 13 (see FIG. 7), a second output shaft sensor 14 (see FIG. 7), a first motor rotation angle sensor 15 (see FIG. 7), a second motor rotation angle sensor 16 (see FIG. 7), a first drive system 17 (see FIG. 7), and a second drive system 18 (see FIG. 7).

As shown in FIG. 1, the shift switching mechanism 2 includes a detent plate 21 (an example of "shift switching member" in the scope of claims) and a detent spring 22 (an example of "positioning member" in the scope of claims). The detent spring 22 holds the detent plate 21 at rotation angle positions respectively corresponding to the P position, the R position, the N position, and the D position.

Figure 2:
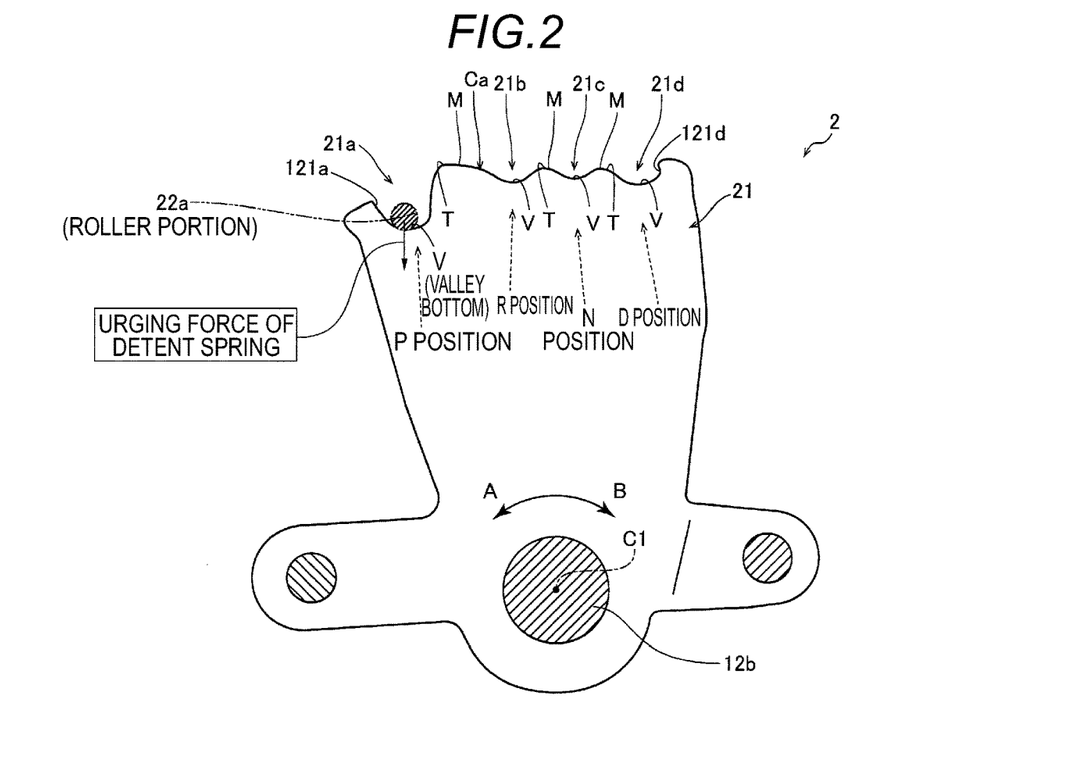
FIG. 2 is a diagram showing a structure of a detent plate constituting the shift device according to the present embodiment.

As shown in FIG. 2, the detent plate 21 includes a plurality of (four) valley portions, that is, a valley portion 21a, a valley portion 21b, a valley portion 21c, and a valley portion 21d (the plurality of valley portions) provided so as to respectively correspond to the shift positions (the P position, the R position, the N position, and the D position). The valley portion 21a, the valley portion 21b, the valley portion 21c, and the valley portion 21d form a cam surface Ca having a continuous undulating shape on the detent plate 21. Further, adjacent valley portions (for example, the valley portions 21a and 21b, and the valley portions 21b and 21c) are separated by a mountain portion M having one top portion T. A base end portion of the detent spring 22 is fixed to a casing of the transmission mechanism, and a free end side thereof is attached to a roller portion 22a. Then, the roller portion 22a in the detent spring 22 always presses the cam surface Ca (the position of any one of the valley portion 21a, the valley portion 21b, the valley portion 21c, the valley portion 21d, or the mountain portion M). Then, a shift position is established in a state where the detent spring 22 is fitted in any one of the plurality of valley portions, that is, the valley portion 21a, the valley portion 21b, the valley portion 21c, and the valley portion 21d.

Further, the valley portion 21a arranged on an outermost end side is provided with a wall portion 121a for preventing the detent spring 22 from moving beyond the valley portion 21a. The valley portion 21d arranged on an outermost end side is provided with a wall portion 121d for preventing the detent spring 22 from moving beyond the valley portion 21d. Specifically, the wall portion 121a is provided at the valley portion 21a arranged at an end portion of the detent plate 21 in a direction of an arrow A. The wall portion 121d is provided at the valley portion 21d arranged at an end portion of the detent plate 21 in a direction of an arrow B.

As shown in FIG. 1, the detent plate 21 is fixed to a lower end portion (a Z2 side) of an output shaft 12b (see FIG. 3) to be described later, and the detent plate 21 is rotated around a rotation axis C1 integrally with the output shaft 12b. Accordingly, the detent spring 22 is configured such that the roller portion 22a slides along the cam surface Ca as the detent plate 21 rotates (swings) forward and reverse in the direction of the arrow A or the direction of the arrow B, so that the roller portion 22a is fitted into any one of the valley portion 21a, the valley portion 21b, the valley portion 21c, and the valley portion 21d by an urging force of the detent spring 22. Further, the detent spring 22 is configured such that the roller portion 22a is selectively fitted into any one of the valley portion 21a, the valley portion 21b, the valley portion 21c, and the valley portion 21d of the detent plate 21, so that the detent plate 21 is held at one of the rotation angle positions respectively corresponding to the P position, the R position, the N position, and the D position. Accordingly, the P position, the R position, the N position, or the D position is individually established.

Next, a detailed configuration of the actuator unit 1 will be described.

Figure 3:
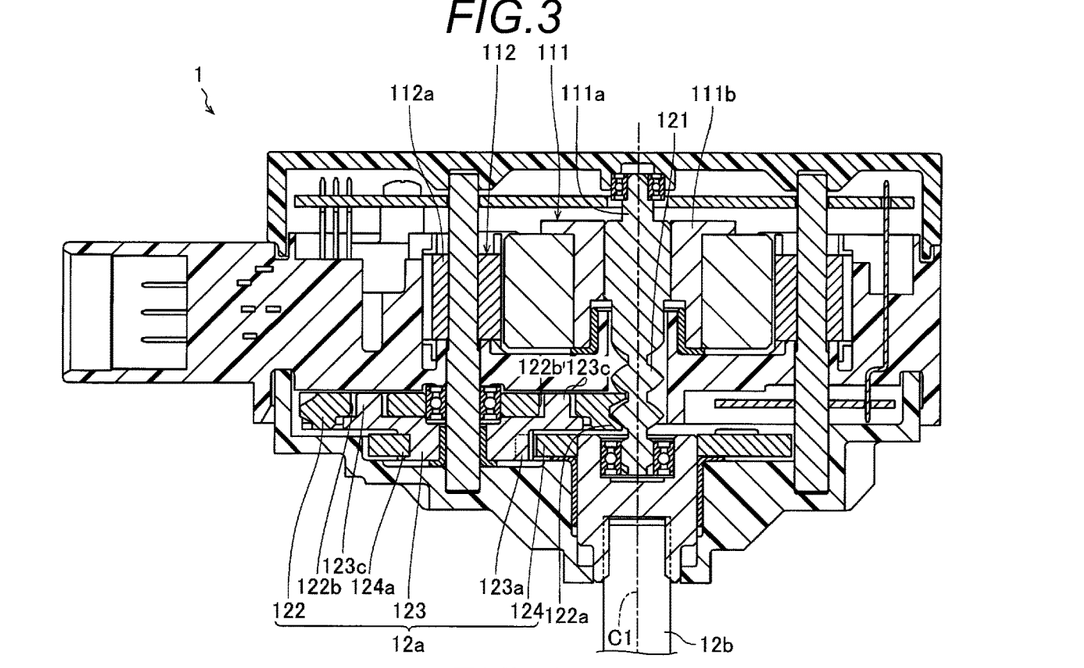
FIG. 3 is a cross-sectional view showing an actuator unit constituting the shift device according to the present embodiment.

As shown in FIG. 3, the motor 11 includes a rotor 111 that is supported rotatably with respect to a motor housing and a stator 112 that faces the rotor 111 with a magnetic gap around the rotor 111. Further, the motor 11 drives the detent plate 21.

Further, a surface permanent magnet (SPM) type three-phase motor obtained by incorporating a permanent magnet in a surface of the rotor 111 is used as the motor 11. Specifically, the rotor 111 includes a shaft pinion 111a and a rotor core 111b.

The shaft pinion 111a of the rotor 111 and the output shaft 12b are rotated around the same rotation axis C1. Further, in the shaft pinion 111a, a gear portion 121 including a gear groove formed in a helical shape is integrally formed in an outer peripheral region extending from a central portion to the lower end portion (the Z2 side).

The stator 112 has a stator core 112a fixed in a motor chamber of the motor housing, and exciting coils (not shown) of a plurality of phases (a U-phase, a V-phase, and a W-phase) that generate a magnetic force when energized.

Figure 4:
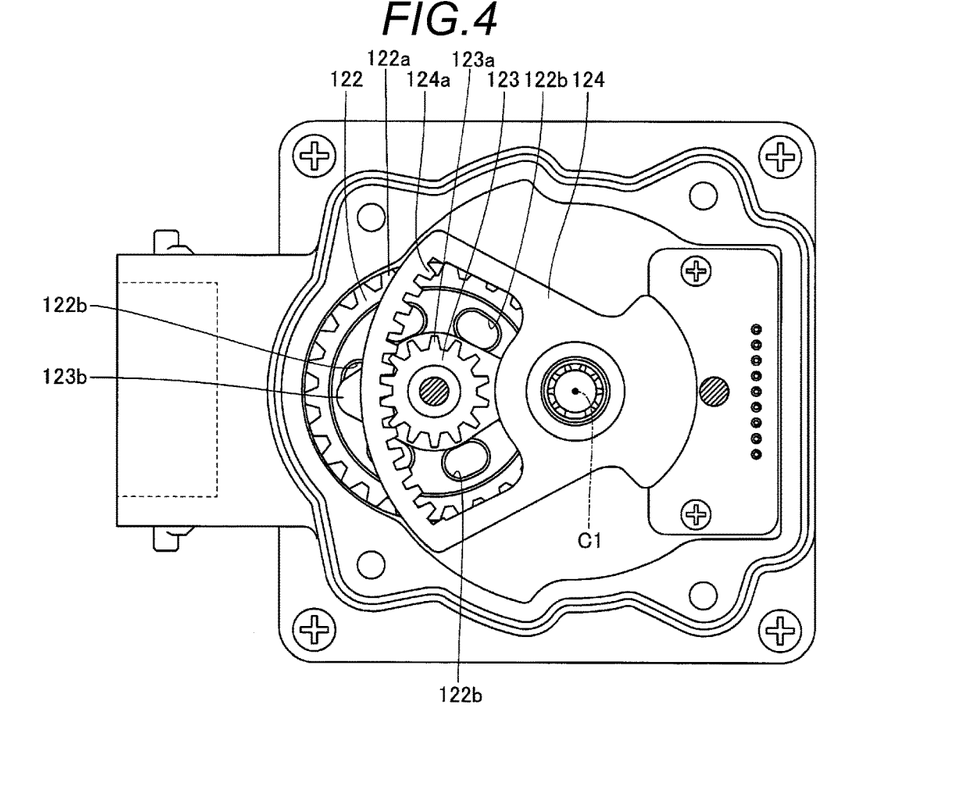
FIG. 4 is a diagram showing an internal structure of a speed reducing mechanism in a state where a gear housing is removed from a main body in the actuator unit constituting the shift device according to the present embodiment.

As shown in FIGS. 3 and 4, the driving force transmission mechanism 12 transmits a driving force of the motor 11 to the detent plate 21 (see FIG. 1). The driving force transmission mechanism 12 includes a speed reducing mechanism 12a and the output shaft 12b.

The speed reducing mechanism 12a rotates the detent plate 21 in a state where a rotational speed transmitted from a motor 11 side is reduced.

Specifically, the speed reducing mechanism 12a includes the gear portion 121 of the rotor 111, an intermediate gear 122 including a gear portion 122a that meshes with the gear portion 121, an intermediate gear 123 that is arranged on a lower surface side (the Z2 side) with the same axis as the intermediate gear 122 and engages with the intermediate gear 122, and a final gear 124 including a gear portion 124a that meshes with a gear portion 123a of the intermediate gear 123.

Figure 5:
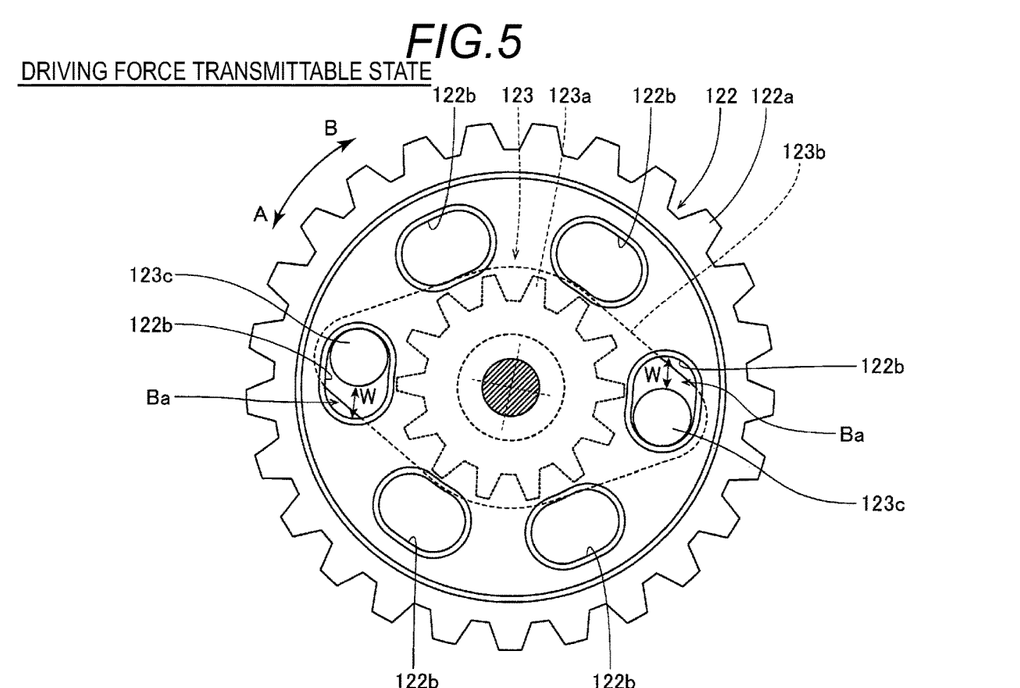
FIG. 5 is a diagram showing an engaged state (a driving force transmittable state) of an intermediate gear in the actuator unit constituting the shift device according to the present embodiment.
Figure 6:
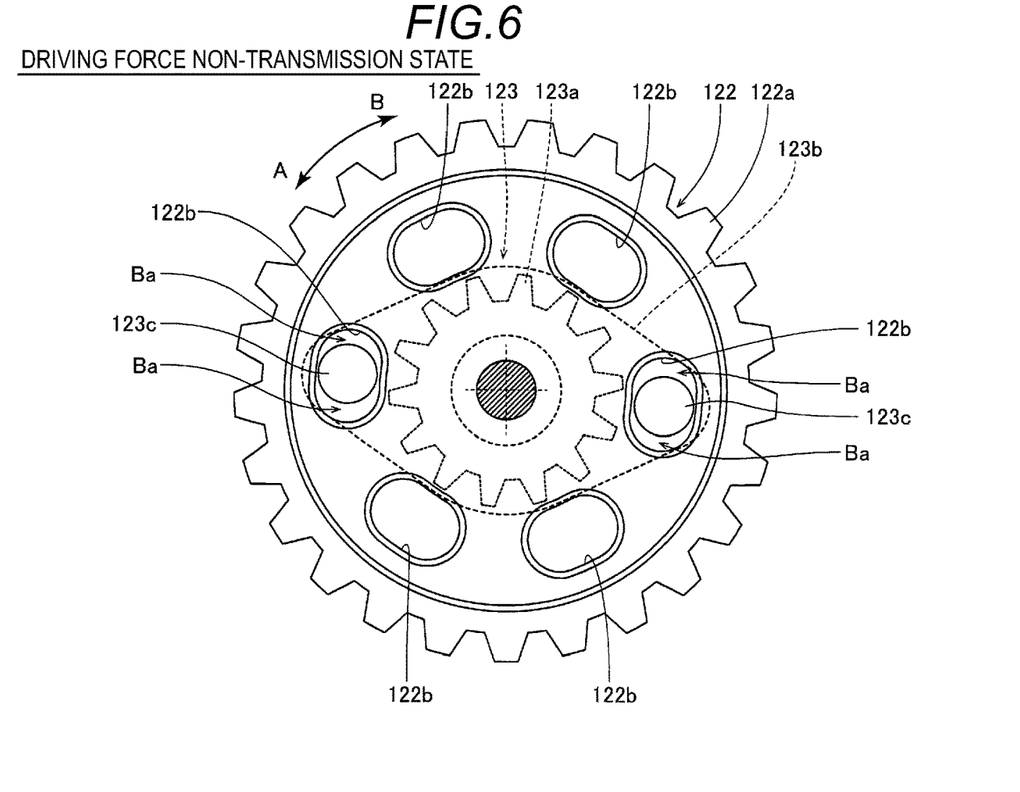
FIG. 6 is a diagram showing an engaged state (a driving force non-transmission state) of the intermediate gear in the actuator unit constituting the shift device according to the present embodiment.

As shown in FIGS. 5 and 6, a plurality of (six) elongated holes 122b having a major axis extending along a circumferential direction are formed between a rotation center portion and an outer peripheral portion (the gear portion 122a) in the intermediate gear 122. The plurality of elongated holes 122b are arranged at intervals of 60 degrees in the circumferential direction. Further, the intermediate gear 123 includes an elliptical main body portion 123b provided with the gear portion 123a, and is provided with a plurality of (two) cylindrical engaging convex portions 123c protruding upward from an upper surface (a Z1 side) facing the gear portion 123a of the main body portion 123b. The engaging convex portions 123c are provided at peripheral edge portions on both sides of the main body portion 123b in a major axis direction. In a state where the intermediate gear 122 is adjacent to the intermediate gear 123 from the lower side toward the upper side (the Z1 side), each of the engaging convex portions 123c arranged at an interval of 180 degrees is inserted (engaged) into a corresponding one of the two elongated holes 122b of the intermediate gear 122.

In addition, the engaging convex portion 123c is fitted into the elongated hole 122b of the intermediate gear 122 with a backlash Ba having a predetermined size (a length in the circumferential direction). That is, relatively free rotation between the intermediate gear 122 and the intermediate gear 123 is allowed by the backlash Ba (a predetermined angular width) in the circumferential direction generated in the engaging convex portion 123c and the elongated hole 122b that are fitted into each other. FIG. 5 shows a state where the driving force can be transmitted from the intermediate gear 122 to the intermediate gear 123, and FIG. 6 shows a state where the driving force cannot be transmitted from the intermediate gear 122 to the intermediate gear 123.

The output shaft 12b outputs the driving force of the motor 11 to the detent plate 21. The output shaft 12b is connected to an output side of the speed reducing mechanism 12a. The output shaft 12b is connected to an input side of the detent plate 21. Accordingly, the output shaft 12b and the detent plate 21 integrally operate.

As shown in FIG. 7, the first output shaft sensor 13 detects a rotation angle of the output shaft 12b. For example, the first output shaft sensor 13 includes a hall element. A rotational position (an output angle) of the output shaft 12b is detected as a continuous output shaft angle. The second output shaft sensor 14 detects a rotation angle of the output shaft 12b. For example, the second output shaft sensor 14 includes a hall element. The rotational position (the output angle) of the output shaft 12b is detected as a continuous output shaft angle.

The first motor rotation angle sensor 15 detects a rotation angle of the rotor 111 of the motor 11. For example, the first motor rotation angle sensor 15 includes a magneto resistive (MR) sensor. The second motor rotation angle sensor 16 detects a rotation angle of the rotor 111 of the motor 11. For example, the second motor rotation angle sensor 16 includes an MR sensor.

The first drive system 17 performs control to drive the motor 11 based on measurement values of the first output shaft sensor 13 and the first motor rotation angle sensor 15. The first drive system 17 controls the motor 11 independently of the second drive system 18. Specifically, the first drive system 17 includes a first MCU 171 (an example of "first control unit" in the scope of claims), a storage unit (not shown), a first driver 172, and a first inverter 173.

The first MCU 171 and the first output shaft sensor 13 are electrically connected to each other. The first MCU 171 and the first motor rotation angle sensor 15 are electrically connected to each other. The first MCU 171 and the first driver 172 are electrically connected to each other. The first driver 172 and the first inverter 173 are electrically connected to each other.

The first MCU 171 controls a voltage for driving the motor 11. The storage unit is a storage device including memories such as a read only memory (ROM) and a random access memory (RAM). The first driver 172 transmits a signal for controlling the first inverter 173. The first inverter 173 includes a plurality of (six) driving field effect transistors (FETs) 174 that are switched between ON and OFF in response to the signal from the first driver 172. In the first inverter 173, sine-wave three-phase AC voltages (a U-phase, a V-phase, and a W-phase) are output by switching ON and OFF of the plurality of driving FETs 174. Therefore, the first inverter 173 outputs a voltage for driving the motor 11. The first inverter 173 includes an upper arm 173a including a plurality of (three) driving FETs 174 and a lower arm 173b including a plurality of (three) driving FETs 174.

The second drive system 18 performs control to drive the motor 11 based on measurement values of the second output shaft sensor 14 and the second motor rotation angle sensor 16. The second drive system 18 controls the motor 11 independently of the first drive system 17. Specifically, the second drive system 18 includes a second MCU 181 (an example of "second control unit" in the scope of claims), a storage unit (not shown), a second driver 182, and a second inverter 183.

The second MCU 181 and the second output shaft sensor 14 are electrically connected to each other. The second MCU 181 and the second motor rotation angle sensor 16 are electrically connected to each other. The second MCU 181 and the second driver 182 are electrically connected to each other. The second driver 182 and the second inverter 183 are electrically connected to each other.

The second MCU 181 controls a voltage for driving the motor 11. The storage unit is a storage device including memories such as a ROM and a RAM. The second driver 182 transmits a signal for controlling the second inverter 183. The second inverter 183 includes a plurality of (six) driving FETs 184 that are switched between ON and OFF in response to the signal from the second driver 182. In the second inverter 183, sine-wave three-phase AC voltages (the U-phase, the V-phase, and the W-phase) are output by switching ON and OFF of the plurality of driving FETs 184. Therefore, the second inverter 183 outputs a voltage for driving the motor 11. The second inverter 183 includes an upper arm 183a including a plurality of (three) driving FETs 184 and a lower arm 183b including a plurality of (three) driving FETs 184.

Next, a relation between a movement of the shift position and output values of the second output shaft sensor 14 and the second motor rotation angle sensor 16 will be described. A relation between an output value of the first output shaft sensor 13 and an output value of the first motor rotation angle sensor 15 is similar to a relation between the output value of the second output shaft sensor 14 and the output value of the second motor rotation angle sensor 16.

Figure 8:
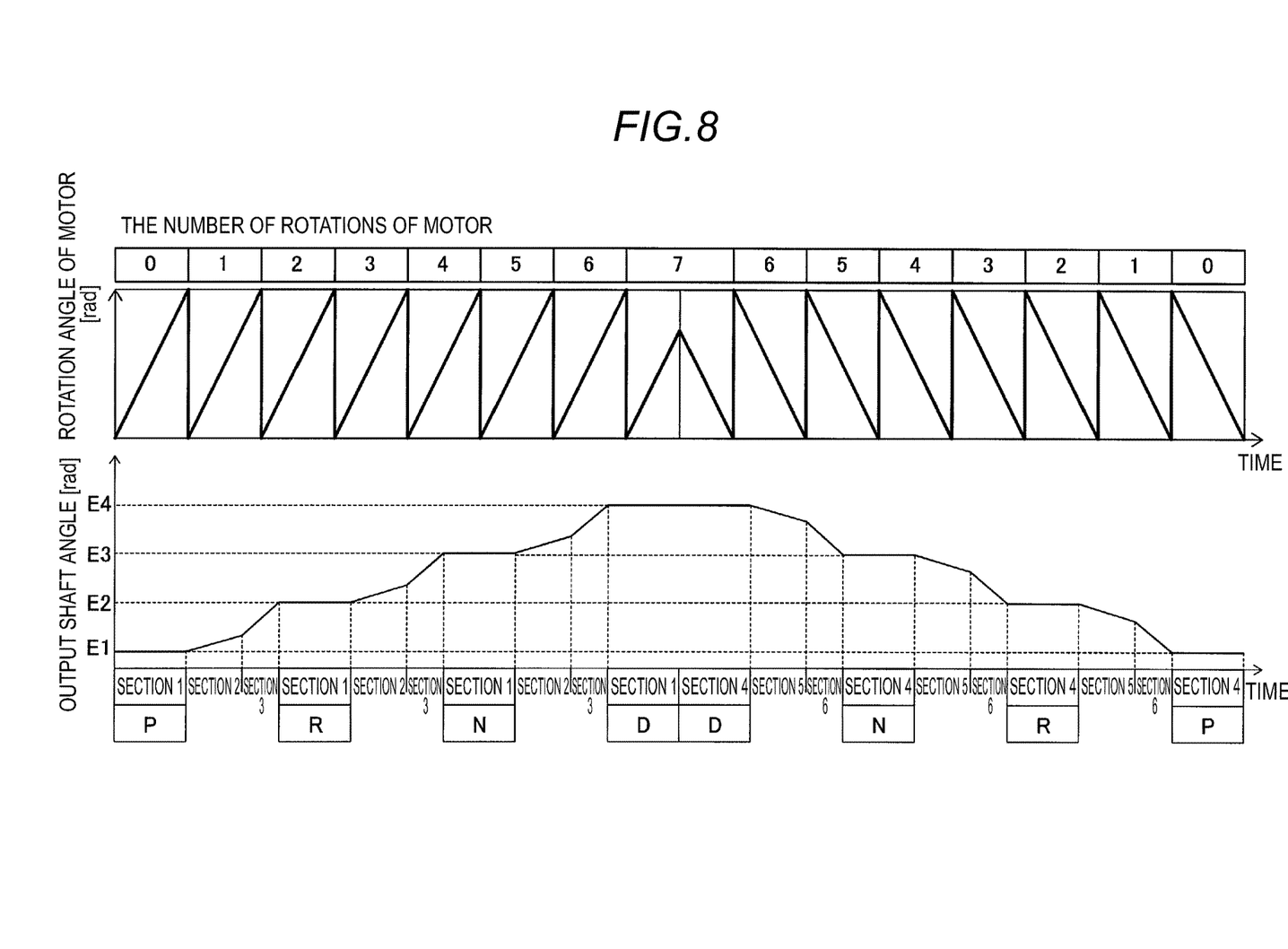
FIG. 8 is a diagram showing a relation among an output value (an output shaft angle) of an output shaft angle sensor, an output value (a motor rotation angle) of a rotor rotation angle sensor, and the number of rotations of a motor in the shift device according to the present embodiment.

As shown in FIG. 8, as the number of rotations of the motor 11 (0 rotation, 1 rotation, 2 rotations, . . . , 7 rotations) increases, the detent plate 21 connected to the output shaft 12b rotates so that the shift position changes in an order of the P position, the R position, the N position, and the D position. At this time, the detent spring 22 is fitted into the valley portion 21a, the valley portion 21b, the valley portion 21c, and the valley portion 21d in order. Further, the output value of the second output shaft sensor 14 increases as the number of rotations of the motor 11 increases.

Figure 9:
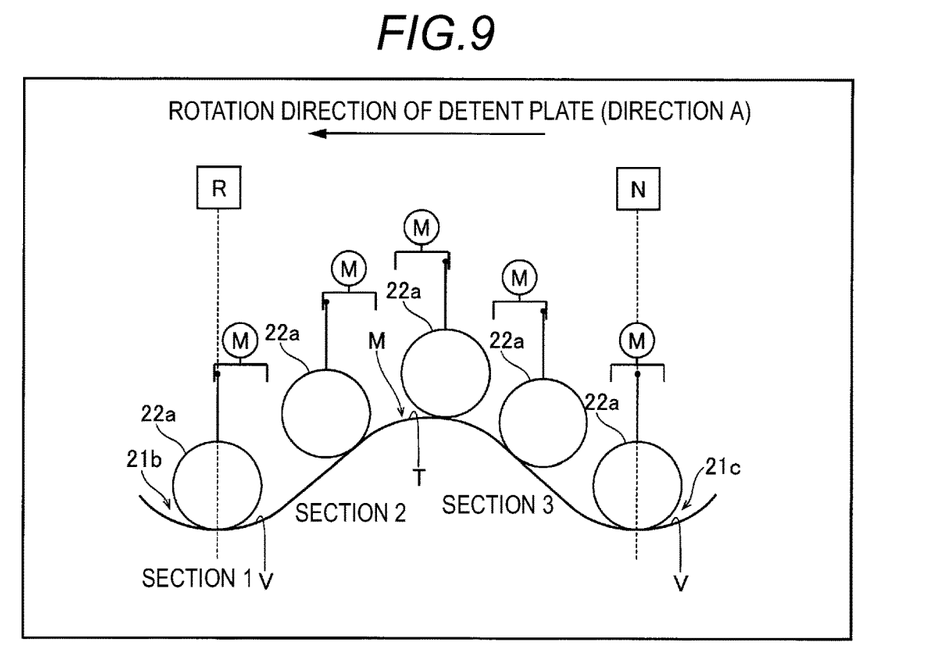
FIG. 9 is a diagram showing a state where a roller portion of the shift device according to the present embodiment is moved from an R position toward an N position.
Figure 10:
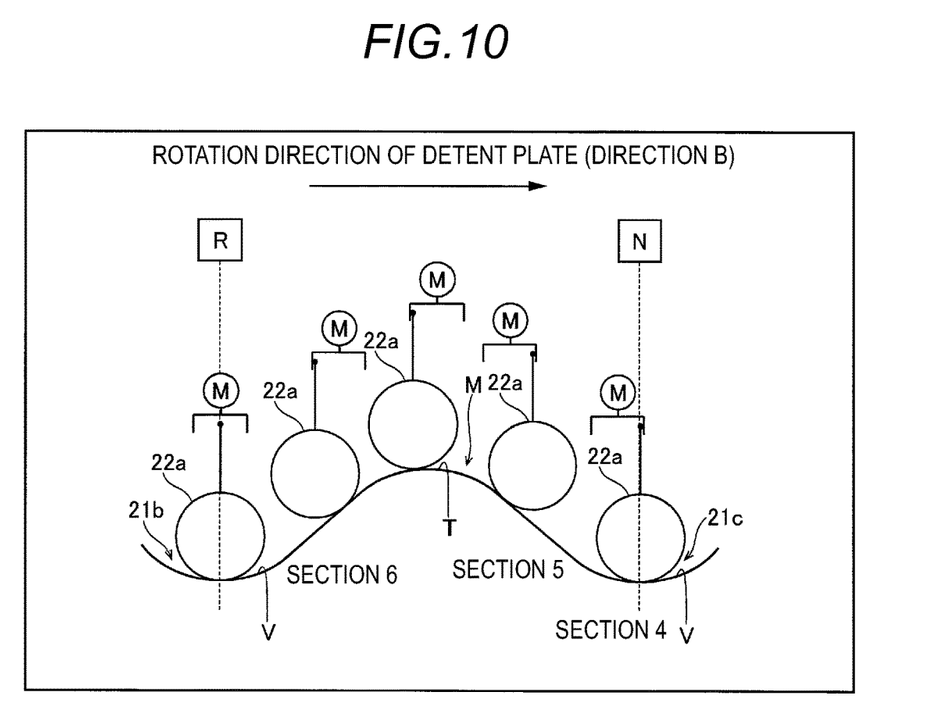
FIG. 10 is a diagram showing a state where the roller portion of the shift device according to the present embodiment is moved from the N position toward the R position.

For example, as shown in FIGS. 9 and 10, it is assumed that the roller portion 22a is currently fitted into the valley portion 21b (the R position) (a Section 1). By driving the motor 11 (see FIG. 3), the detent plate 21 is rotated in the direction of the arrow A via the speed reducing mechanism 12a (see FIG. 3). In addition, a predetermined amount of backlash Ba (see FIG. 6) is provided between the intermediate gear 122 and the intermediate gear 123. Therefore, in a state where the roller portion 22a is completely fitted into a valley bottom V of the valley portion 21b, the engaging convex portion 123c is engaged with an inside of the elongated hole 122b by utilizing the backlash Ba so as not to transmit the driving force even though the intermediate gear 122 is rotated with a rotation of the rotor 111, and thus the intermediate gear 123 is not rotated. As a result, in the section 1, a rotation angle (rad) of the motor 11 detected by the second motor rotation angle sensor 16 (see FIG. 8) linearly increases, and meanwhile, a rotation angle (the output shaft angle (rad)) of the output shaft 12b detected by the second output shaft sensor 14 (see FIG. 8) is constant.

Thereafter, in a section 2, one side end portion of the elongated hole 122b of the intermediate gear 122 is engaged with the engaging convex portion 123c of the intermediate gear 123 so as to transmit the driving force, and thus the driving force of the motor 11 is transmitted to the output shaft 12b (see FIG. 1) via the gear portion 121, the intermediate gear 122, the intermediate gear 123, and the final gear 124 (see FIG. 3). Then, with the rotation of the detent plate 21 in the direction of the arrow A, the roller portion 22a moves so as to climb a slope of the valley portion 21b (the R position) on the valley portion 21c (the N position) side toward the mountain portion M. In the section 2, the rotation angle (rad) of the motor 11 detected by the second motor rotation angle sensor 16 (see FIG. 8) linearly increases. The rotation angle (rad) of the output shaft 12b detected by the second output shaft sensor 14 (see FIG. 8) increases at a constant rate.

Then, in a section 3, after the roller portion 22a climbs over the mountain portion M at a boundary between the valley portion 21b (the R position) and the valley portion 21c (the N position), the detent plate 21 is rotated ahead of the motor 11 (the intermediate gear 122). That is, the detent plate 21 is always urged toward the valley portion 21b by the roller portion 22a, so that this urging force causes the detent plate 21 to rotate ahead of the motor 11 within a range of a size of the backlash Ba of the elongated hole 122b. Then, the roller portion 22a is dropped toward the valley bottom V of the valley portion 21b (see the section 3 in FIG. 8). At this time, the rotation angle of the motor 11 increases, and meanwhile, the rotation angle (rad) of the output shaft 12b rapidly increases as the roller portion 22a drops (is suctioned) into the valley bottom V.

In addition, an operation of moving the shift position from the P position to the R position and an operation of moving the shift position from the N position to the D position are the same as an operation of moving the shift position from the R position to the N position.

Further, as shown in FIGS. 8 and 10, when a rotation direction of the motor 11 is reversed, the shift position is moved to the R position via the N position (the section 4), a section 5, and a section 6.

The operation in the N position (the section 4) is the same as the operation in the section 1. That is, the rotation angle (rad) of the motor 11 detected by the second motor rotation angle sensor 16 linearly decreases, and meanwhile, a rotation angle (rad) of the output shaft 12b detected by the second output shaft sensor 14 is constant.

Further, the operation in the section 5 is the same as the operation in the section 2. That is, in the section 5, the rotation angle of the motor 11 linearly decreases, and the rotation angle (rad) of the output shaft 12b decreases at a constant rate.

Further, the operation in the section 6 is the same as the operation in the section 3. That is, the rotation angle of the motor 11 decreases, and meanwhile, the rotation angle (rad) of the output shaft 12b rapidly decreases as the roller portion 22a drops (is suctioned) into the valley bottom V.

In the shift device 100, for example, at the time of factory shipment, the rotation angle of the motor 11 (the rotor 111) corresponding to the valley bottom V is acquired (learned) for each shift device 100. That is, the rotation angle of the motor 11 (the rotor 111) corresponding to the valley bottom V (a center of the backlash Ba) at each of the plurality of shift positions (the P position, the R position, the N position, and the D position) is acquired (learned). In detail, a backlash width W of the speed reducing mechanism 12a is detected in the valley portion 21a, the valley portion 21b, the valley portion 21c, and the valley portion 21d corresponding to the plurality of shift positions (the P position, the R position, the N position, and the D position). The center of the width W of the detected backlash Ba is learned as the valley bottom V (the shift position). The rotation angle of the motor 11 corresponding to the valley bottom V is acquired by the first MCU 171 and the second MCU 181.

Accordingly, in the shift device 100, the shift position is switched by the first MCU 171 and the second MCU 181 based on the rotation angle of the motor 11 corresponding to the valley bottom V acquired by each of the first MCU 171 and the second MCU 181. That is, in the shift device 100, the detent spring 22 is controlled to move to a position of the valley bottom V corresponding to each of the P position, the R position, the N position, and the D position selected by the shift operation of the occupant.

(Drive Control by Both Systems)

Here, in the shift device 100 according to the present embodiment, the motor 11 is driven by the voltages output from both the first drive system 17 and the second drive system 18, and the shift position is switched. That is, each of the first MCU 171 and the second MCU 181 independently (asynchronously) controls the detent spring 22 to move to the position of the valley bottom V corresponding to each of the P position, the R position, the N position, and the D position selected by the shift operation of the occupant.

Specifically, when the shift device 100 switches the shift position, the first drive system 17 drives the motor 11 based on the measurement values of the first motor rotation angle sensor 15 and the first output shaft sensor 13, and the second drive system 18 drives the motor 11 based on the measurement values of the second motor rotation angle sensor 16 and the second output shaft sensor 14.

Here, when the motor 11 is driven by both the first drive system 17 and the second drive system 18, the ON and OFF of each of the plurality of (six) driving FETs 174 of the first drive system 17 is switched, so that an energization pattern of a driving current output to the motor 11 is changed. Further, when the motor 11 is driven by both the first drive system 17 and the second drive system 18, the ON and OFF of each of the plurality of (six) driving FETs 184 of the second drive system 18 is switched, so that the energization pattern of the driving current output to the motor 11 is changed.

Figure 11:
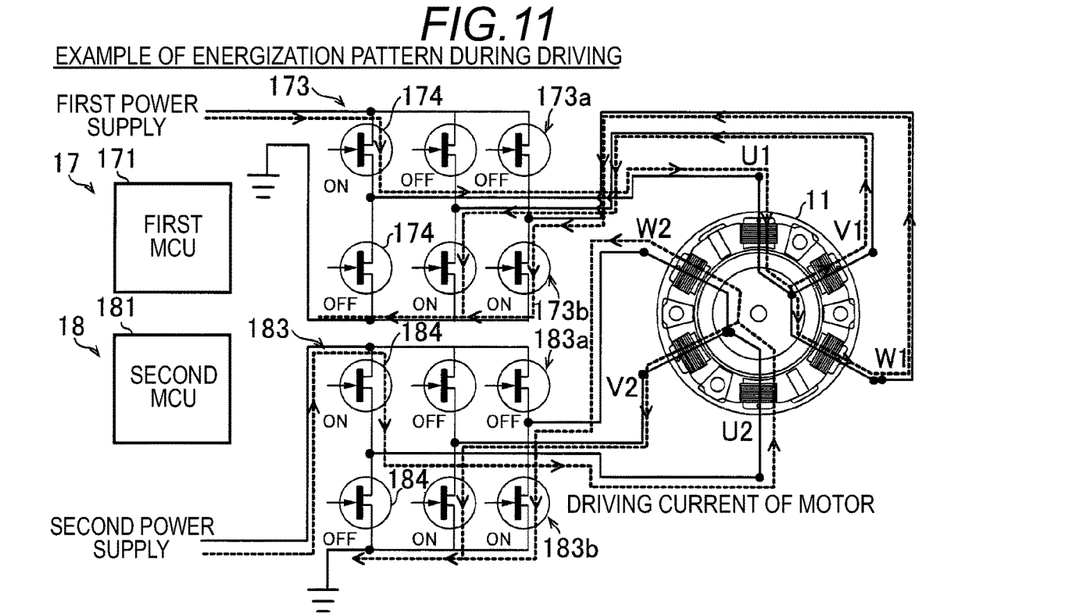
FIG. 11 is a diagram showing an example of an energization pattern when the motor is driven by the first drive system and the second drive system of the shift device according to the present embodiment.

An example of the energization pattern of the driving current output to the motor 11 is shown in FIG. 11. In the first drive system 17, a U-phase driving FET 174 of the upper arm 173a is ON, a V-phase driving FET 174 of the upper arm 173a is OFF, and a W-phase driving FET 174 of the upper arm 173a is OFF. In the first drive system 17, a U-phase driving FET 174 of the lower arm 173b is OFF, a V-phase driving FET 174 of the lower arm 173b is ON, and a W-phase driving FET 174 of the lower arm 173b is ON.

In the second drive system 18, a U-phase driving FET 184 of the upper arm 183a is ON, a V-phase driving FET 184 of the upper arm 183a is OFF, and a W-phase driving FET 184 of the upper arm 183a is OFF. In the second drive system 18, a U-phase driving FET 184 of the lower arm 183b is OFF, a V-phase driving FET 184 of the lower arm 183b is ON, and a W-phase driving FET 184 of the lower arm 183b is ON.

Accordingly, in the first drive system 17, the driving current flows from the U phase of the upper arm 173a to each of the V phase and the W phase of the lower arm 173b through the exciting coils of the motor 11, and in the second drive system 18, the driving current flows from the U phase of the upper arm 183a to each of the V phase and the W phase of the lower arm 183b through the exciting coils of the motor 11, so that the motor 11 is driven.

Here, at the time of the shift switching, each of the first drive system 17 and the second drive system 18 independently drives the motor 11 when the motor 11 is driven by both the first drive system 17 and the second drive system 18, and thus there is concern about the drive interference between the systems. The drive interference will be described with reference to FIG. 12 which shows an example of a state where the shift position is switched from the P position to the R position.

Figure 12:
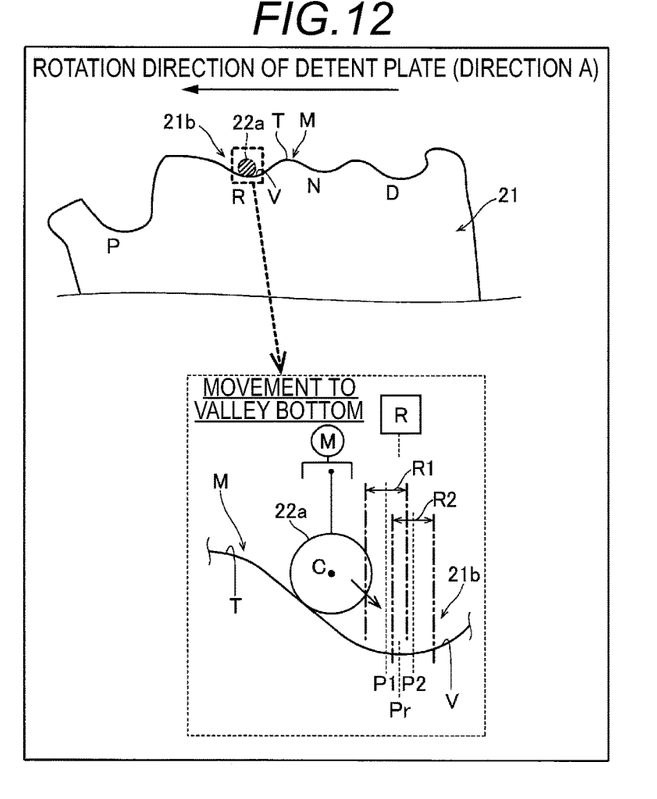
FIG. 12 is a diagram showing a state where a detent spring moves in valley bottoms of a plurality of valley portions in the shift device according to the present embodiment.

As shown in FIG. 12, in the shift device 100, the first MCU 171 of the first drive system 17 learns (acquires), in advance, a valley bottom learning position P1 (an example of "shift position obtained in advance" in the scope of claims) of each of the valley bottoms V of the valley portion 21a, the valley portion 21b, the valley portion 21c, and the valley portion 21d respectively corresponding to the P position, the R position, the N position, and the D position. In the first MCU 171, a first reaching range R1 (an example of "position reaching determination range" in the scope of claims) for determining that the detent spring 22 has reached the valley bottom learning position P1 is set in advance. The first reaching range R1 is set based on the valley bottom learning position P1 learned in advance of each of the valley bottoms V of the valley portion 21a, the valley portion 21b, the valley portion 21c, and the valley portion 21d, a variation of an error between an actual valley bottom position Pr of an actual valley bottom V and the valley bottom learning position P1 learned by the first drive system 17, and a design value such as an allowable error for the motor 11 to stop.

Similarly, in the shift device 100, separately from the first drive system 17, the second MCU 181 of the second drive system 18 learns (acquires), in advance, a valley bottom learning position P2 (an example of "shift position obtained in advance" in the scope of claims) of each of the valley bottoms V of the valley portion 21a, the valley portion 21b, the valley portion 21c, and the valley portion 21d respectively corresponding to the P position, the R position, the N position, and the D position. In the second MCU 181, a second reaching range R2 (an example of "position reaching determination range" in the scope of claims) for determining that the detent spring 22 has reached the learned valley bottom learning position P2 of each of the valley bottoms V of the valley portion 21a, the valley portion 21b, the valley portion 21c, and the valley portion 21d is set in advance. The second reaching range R2 is set based on the valley bottom learning position P2 learned in advance of each of the valley bottoms V of the valley portion 21a, the valley portion 21b, the valley portion 21c, and the valley portion 21d, a variation of an error between the actual valley bottom position Pr of the actual valley bottom V and the valley bottom learning position P2 learned by the second drive system 18, and the design value such as an allowable error for the motor 11 to stop.

There are variations in the valley bottom learning position P1 learned by the first drive system 17 and the valley bottom learning position P2 learned by the second drive system 18. Therefore, for example, as shown in FIG. 12, the valley bottom learning position P1 at the R position in the first drive system 17 may be closer to the P position than the actual valley bottom position Pr, and the valley bottom learning position P2 at the R position in the second drive system 18 may be closer to the N position than the actual valley bottom position Pr.

In such a case, since the detent spring 22 enters the first reaching range R1, the first MCU 171 determines that the shift position is switched to the R position before the second MCU 181. On the other hand, since the detent spring 22 does not enter the second reaching range R2, the second MCU 181 does not determine that the shift position is switched to the R position. Here, when the first MCU 171 performs control of causing braking of the motor 11 based on the fact that the detent spring 22 enters the first reaching range R1, the second MCU 181 performs control of driving the motor 11 in order to make the detent spring 22 enter the second reaching range R2. Therefore, the drive of the second drive system 18 is hindered by the first drive system 17. This is the drive interference between the systems.

Therefore, in the shift device 100, when the detent spring 22 reaches each of the valley portion 21a, the valley portion 21b, the valley portion 21c, and the valley portion 21d, a leading one drive system of the first drive system 17 and the second drive system 18, which determines first that the detent spring 22 has reached each of the valley portion 21a, the valley portion 21b, the valley portion 21c, and the valley portion 21d, does not execute the braking processing of the motor 11. In the example shown in FIG. 12, the first MCU 171 of the leading first drive system 17, which determines first that the detent spring 22 has reached the valley portion 21b, performs control of freely driving the motor 11 without causing the braking of the motor 11 based on the fact that the detent spring 22 has entered the first reaching range R1.

That is, in the shift device 100, when the detent spring 22 reaches each of the valley portion 21a, the valley portion 21b, the valley portion 21c, and the valley portion 21d, the first inverter 173 of the first drive system 17 as the leading one drive system is turned off or the second inverter 183 of the second drive system 18 as the leading one drive system is turned off so as not to execute the braking processing of the motor 11. In examples shown in FIGS. 12 and 13, the first MCU 171 of the leading first drive system 17, which determines first that the detent spring 22 has reached the valley portion 21b, turns off all of the first inverter 173 to perform control to freely drive the motor 11 without causing the braking of the motor 11 based on the fact that the detent spring 22 has entered the first reaching range R1.

Figure 13:
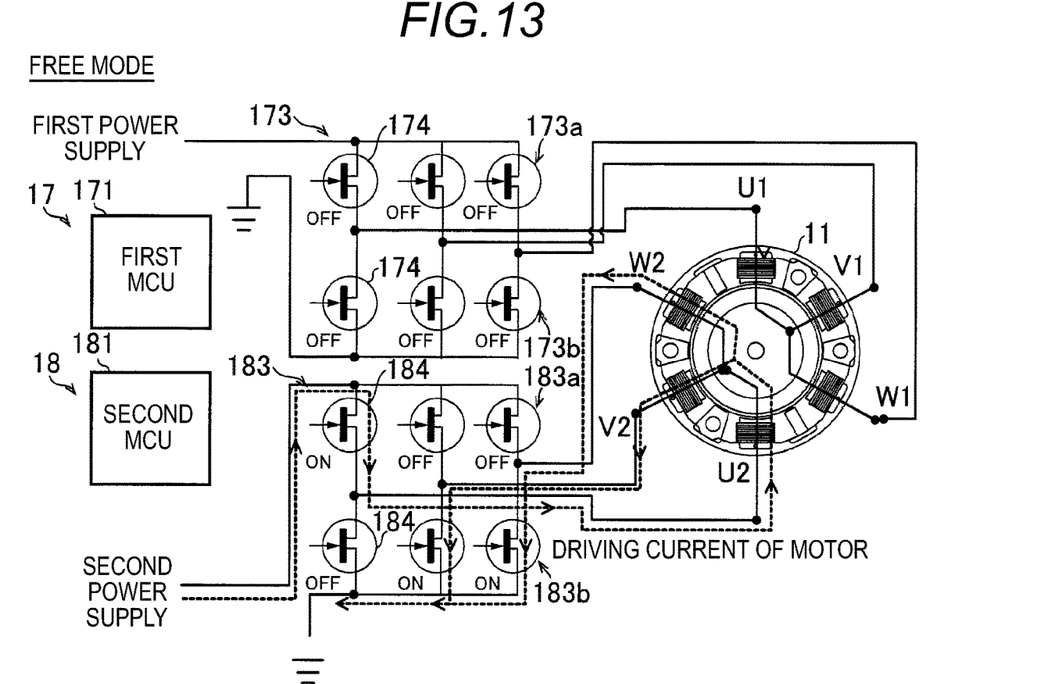
FIG. 13 is a diagram showing a state where the first drive system of the shift device according to the present embodiment is set to a free mode.

Specifically, when the leading one drive system is the first drive system 17, the first MCU 171 performs control of not executing the braking processing of the motor 11 when the detent spring 22 reaches each of the valley portion 21a, the valley portion 21b, the valley portion 21c, and the valley portion 21d, based on the facts that a difference between the valley bottom learning position P1 and a current position of the detent spring 22 is within the first reaching range R1 and a rotational speed of the motor 11 is within a speed reaching determination range. When the leading one drive system is the second drive system 18, the second MCU 181 performs control of not executing the braking processing of the motor 11 when the detent spring 22 reaches each of the valley portion 21a, the valley portion 21b, the valley portion 21c, and the valley portion 21d, based on the facts that a difference between the valley bottom learning position P2 and a current position of the detent spring 22 is within the second reaching range R2, and a rotational speed of the motor 11 is within the speed reaching determination range.

Here, the difference with the current position of the detent spring 22 being within the first reaching range R1 and the difference with the current position of the detent spring 22 being within the second reaching range R2 are conditions for confirming the position of the detent spring 22. The rotational speed of the motor 11 being within the speed reaching determination range is an upper limit for confirming whether the motor 11 is sufficiently decelerated when the detent spring 22 reaches the valley bottom V of each of the valley portion 21a, the valley portion 21b, the valley portion 21c, and the valley portion 21d.

Specifically, the leading one drive system does not execute braking for the predetermined time when the detent spring 22 reaches the valley bottom V of each of the valley portion 21a, the valley portion 21b, the valley portion 21c, and the valley portion 21d. The predetermined time indicates a time during which the detent spring 22 having entered the first reaching range R1 can enter the second reaching range R2 when the leading one drive system is the first drive system 17. Further, the predetermined time indicates a time during which the detent spring 22 having entered the second reaching range R2 can enter the first reaching range R1 when the leading one drive system is the second drive system 18. The predetermined time is calculated by the first MCU 171 based on the number of rotations of the motor 11 immediately before reaching the first reaching range R1, or is calculated by the second MCU 181 based on the number of rotations of the motor 11 immediately before reaching the second reaching range R2.

The leading one drive system causes the braking of the motor 11 based on the elapse of the predetermined time. That is, when the leading one drive system is the first drive system 17, the first MCU 171 performs control of turning on the driving FETs 174 (switching elements) on the lower arm 173b side of the first inverter 173 of the first drive system 17, and turning off the driving FETs 174 (switching elements) on the upper arm 173a side of the first inverter 173 of the first drive system 17 based on the elapse of the predetermined time. Further, when the leading one drive system is the second drive system 18, the second MCU 181 performs control of turning on the driving FETs 184 (switching elements) on the lower arm 183b side of the second inverter 183 of the second drive system 18, and turning off the driving FETs 184 (switching elements) on the upper arm 183a side of the second inverter 183 of the second drive system 18 based on the elapse of the predetermined time. Accordingly, braking (a short brake) of the drive of the motor 11 occurs.

Figure 14:
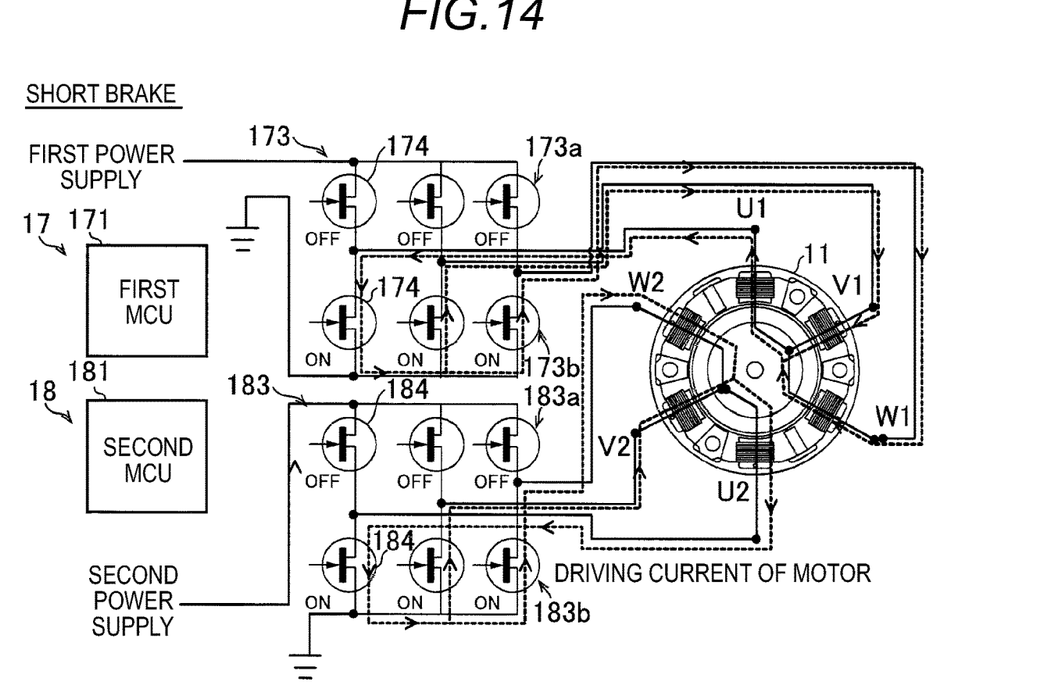
FIG. 14 is a diagram showing a state where the motor is driven by the first drive system and the second drive system of the shift device according to the present embodiment.

After the elapse of a predetermined time, the position of the detent spring 22 is within the first reaching range R1 and is within the second reaching range R2, and thus, as shown in FIG. 14, both the first drive system 17 and the second drive system 18 cause the braking of the motor 11.

(Shift Switching Processing)

Figure 15:
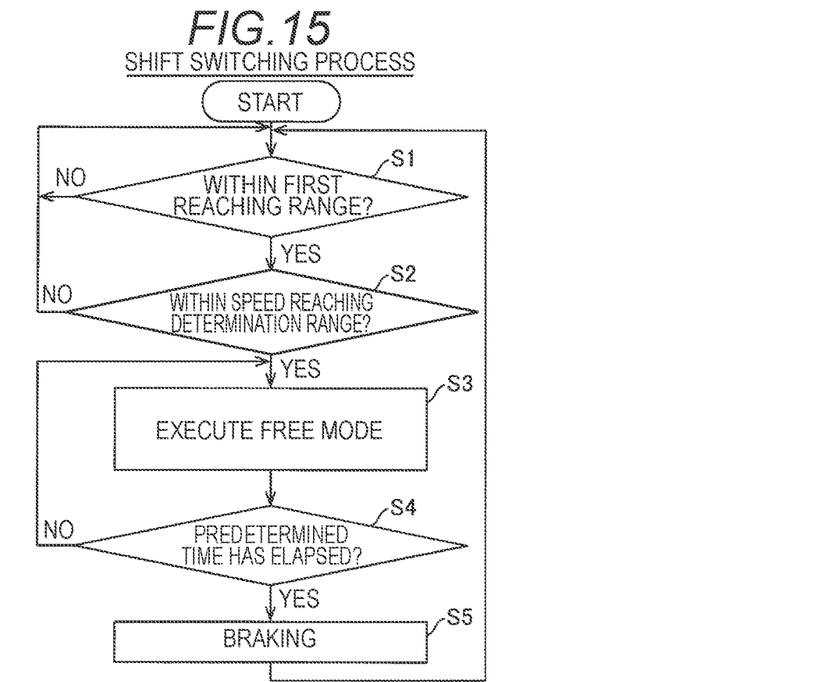
FIG. 15 is a flowchart showing a shift switching processing performed by the first drive system in the shift device according to the present embodiment.

Hereinafter, the shift switching processing when the first drive system 17 is the leading one, and the detent spring 22 reaches any one of the valley portion 21a, the valley portion 21b, the valley portion 21c, and the valley portion 21d will be described with reference to FIG. 15. The shift switching processing is processing in which the drive of the motor 11 by the first drive system 17 and the drive of the motor 11 by the second drive system 18 are executed in parallel.

In step S1, the first MCU 171 determines whether the detent spring 22 has entered the first reaching range R1. When the detent spring 22 has entered the first reaching range R1, the processing proceeds to step S2, and when the detent spring 22 has not entered the first reaching range R1, the processing returns to step S1. In step S2, the first MCU 171 determines whether the rotational speed of the motor 11 is within the speed reaching determination range. When the rotational speed of the motor 11 is within the speed reaching determination range, the processing proceeds to step S3, and when the rotational speed of the motor 11 is not within the speed reaching determination range, the processing returns to step S1.

In step S3, the first MCU 171 executes a free mode as a drive control mode of the motor 11. That is, the first MCU 171 turns off all the driving FETs 174 of the first inverter 173, so that control is performed such that the second drive system 18 can drive the motor 11 freely without causing the braking of the motor 11. In step S4, the first MCU 171 determines whether the predetermined time has elapsed. When the predetermined time has elapsed, the processing proceeds to step S5, and when the predetermined time does not elapse, the processing returns to step S3. In step S5, the first MCU 171 repeats step S1 after causing the braking of the motor 11.

Figure 16:
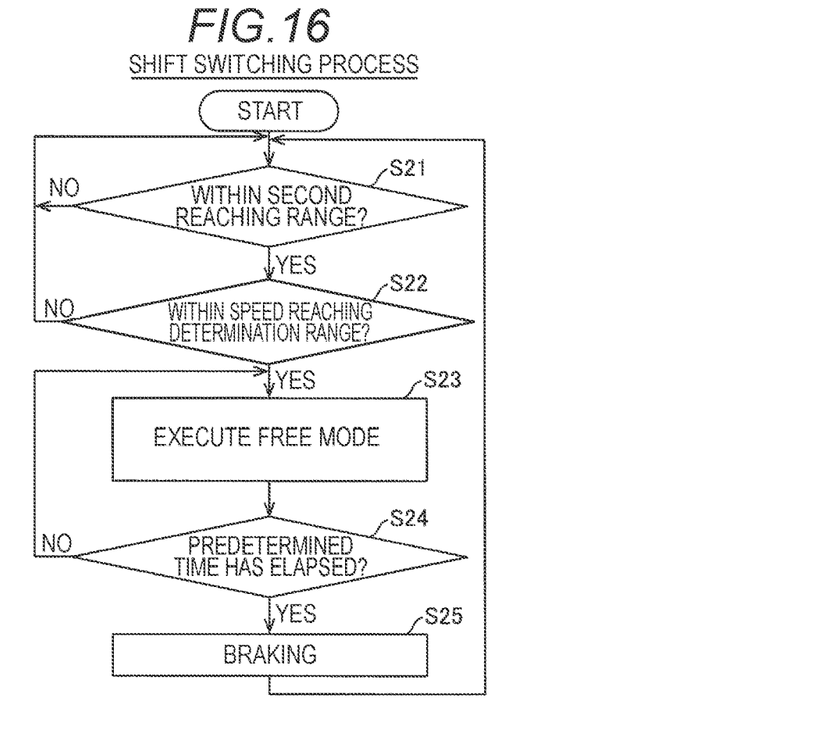
FIG. 16 is a flowchart showing a shift switching processing performed by the second drive system in the shift device according to the present embodiment.

Hereinafter, the shift switching processing when the second drive system 18 is the leading one, and the detent spring 22 reaches any one of the valley portion 21a, the valley portion 21b, the valley portion 21c, and the valley portion 21d will be described with reference to FIG. 16. In the shift switching processing, the drive of the motor 11 by the first drive system 17 and the drive of the motor 11 by the second drive system 18 are executed in parallel.

In step S21, the second MCU 181 determines whether the detent spring 22 has entered the second reaching range R2. When the detent spring 22 has entered the second reaching range R2, the processing proceeds to step S22, and when the detent spring 22 has not entered the second reaching range R2, the processing returns to step S21. In step S22, the second MCU 181 determines whether the rotational speed of the motor 11 is within the speed reaching determination range. When the rotational speed of the motor 11 is within the speed reaching determination range, the processing proceeds to step S23, and when the rotational speed of the motor 11 is not within the speed reaching determination range, the processing returns to step S21.

In step S23, the second MCU 181 executes a free mode as a drive control mode of the motor 11. That is, the second MCU 181 turns off all the driving FETs 184 of the second inverter 183, so that control is performed such that the first drive system 17 can drive the motor 11 freely without causing the braking of the motor 11. In step S24, the second MCU 181 determines whether the predetermined time has elapsed. When the predetermined time has elapsed, the processing proceeds to step S25, and when the predetermined time does not elapse, the processing returns to step S23. In step S25, the second MCU 181 repeats step S21 after causing the braking of the motor 11.

Effect of Present Embodiment

In the present embodiment, the following effects can be obtained.

As described above, in the present embodiment, the motor 11 is driven by the voltages output from both the first drive system 17 and the second drive system 18, and the shift position is switched. Accordingly, when a failure is detected in either the first drive system 17 or the second drive system 18 during the shift switching, it is possible to take a measure (the fail-safe) of stopping the drive of the motor 11 by the failure drive system while the drive of the motor 11 by the normal drive system is continued, and thus the drive of the motor 11 can be continued. As a result, when a failure is detected in either the first drive system 17 or the second drive system 18 during the shift switching, the drive control of the motor 11 is not executed intermittently, and thus the drive control of the motor 11 can be executed smoothly even if an abnormality is detected during the shift switching. In addition, by driving the motor 11 using both the first drive system 17 and the second drive system 18, power required for outputting a maximum torque of the motor 11 can be distributed to each of the first drive system 17 and the second drive system 18. Therefore, it is possible to prevent an increase in the size of each of the first drive system 17 and the second drive system 18 in comparison with a case where the maximum torque of the motor 11 is output using either the first drive system 17 or the second drive system 18.

As described above, in the present embodiment, when the detent spring 22 reaches each of the valley portion 21a, the valley portion 21b, the valley portion 21c, and the valley portion 21d, the leading one drive system of the first drive system 17 and the second drive system 18, which determines first that the detent spring 22 has reached each of the valley portion 21a, the valley portion 21b, the valley portion 21c, and the valley portion 21d, does not execute the braking processing of the motor 11. Therefore, before the other drive system, which is delayed in determining that the detent spring 22 has reached each of the valley portion 21a, the valley portion 21b, the valley portion 21c, and the valley portion 21d, determines that the detent spring 22 has reached each of the valley portion 21a, the valley portion 21b, the valley portion 21c, and the valley portion 21d, the leading one drive system can prevent the braking of the motor 11, and thus the drive of the motor 11 by the other drive system can be prevented from being hindered.

As described above, in the present embodiment, when the detent spring 22 reaches each of the valley portion 21a, the valley portion 21b, the valley portion 21c, and the valley portion 21d, the first inverter 173 of the first drive system 17 as the leading one drive system which determines first that the detent spring 22 has reached each of the valley portion 21a, the valley portion 21b, the valley portion 21c, and the valley portion 21d is turned off or the second inverter 183 of the second drive system 18 as the leading one drive system which determines first that the detent spring 22 has reached each of the valley portion 21a, the valley portion 21b, the valley portion 21c, and the valley portion 21d is turned off so as not to execute the braking processing of the motor 11. Accordingly, since no power is supplied to the motor 11 from the leading one drive system which determines first that the detent spring 22 has reached each of the valley portion 21a, the valley portion 21b, the valley portion 21c, and the valley portion 21d, the motor 11 can be driven by only the other drive system which is delayed in determining that the detent spring 22 has reached each of the valley portion 21a, the valley portion 21b, the valley portion 21c, and the valley portion 21d. As a result, the motor 11 can be driven as required by the other drive system that is delayed in the determination.

As described above, in the present embodiment, when the detent spring 22 reaches each of the valley portion 21a, the valley portion 21b, the valley portion 21c, and the valley portion 21d, the leading one drive system which determines first that the detent spring 22 has reached each of the valley portion 21a, the valley portion 21b, the valley portion 21c, and the valley portion 21d does not cause the braking for the predetermined time. Accordingly, since it is possible to secure, for a predetermined time, a time during which the motor 11 can be driven as required by the other drive system which is delayed in determining that the detent spring 22 has reached each of the valley portion 21a, the valley portion 21b, the valley portion 21c, and the valley portion 21d, and thus, the other drive system that is delayed in the determination can also cause the detent spring 22 to reliably reach each of the valley portion 21a, the valley portion 21b, the valley portion 21c, and the valley portion 21d.

As described above, in the present embodiment, the leading one drive system causes the braking of the motor 11 based on the elapse of the predetermined time. Accordingly, the detent spring 22 can be stopped near the valley bottom learning position P1 (the valley bottom learning position P2) of each of the valley portion 21a, the valley portion 21b, the valley portion 21c, and the valley portion 21d learned in advance in one drive system while ensuring the drive time of the motor 11 by only the other drive system which is delayed in determining that the detent spring 22 has reached each of the valley portion 21a, the valley portion 21b, the valley portion 21c, and the valley portion 21d, so that the drive interference between the first drive system 17 and the second drive system 18 can be prevented, and the shift switching can be executed accurately.

As described above, in the present embodiment, when the detent spring 22 reaches each of the valley portion 21a, the valley portion 21b, the valley portion 21c, and the valley portion 21d, the leading one drive system which determines first that the detent spring 22 has reached each of the valley portion 21a, the valley portion 21b, the valley portion 21c, and the valley portion 21d does not execute the braking processing of the motor 11, based on the facts that the difference between the shift position obtained in advance and a current position of the detent spring 22 is within the first reaching range R1 (the second reaching range R2) and the rotational speed of the motor 11 is within the speed reaching determination range. Accordingly, since the detent spring 22 can enter the first reaching range R1 (the second reaching range R2) in a state where the motor 11 is sufficiently decelerated so that the detent spring 22 does not pass the shift position, it is possible to prevent the detent spring 22 from passing the shift position due to the fact that the braking processing of the motor 11 is not executed.

Modification

It should be considered that the above-mentioned embodiment disclosed here is an example in all respects and is not restrictive. The scope of this disclosure is shown by the scope of claims rather than the description of the embodiment described above and further includes all changes (modifications) within meaning and scope equivalent to the scope of claims.

For example, the present embodiment shows an example in which the leading one drive system of the first drive system 17 and the second drive system 18 does not execute the braking processing of the motor 11 when the detent spring 22 reaches each of the valley portion 21a, the valley portion 21b, the valley portion 21c, and the valley portion 21d, but this disclosure is not limited thereto. In this disclosure, the leading one drive system of the first drive system and the second drive system may execute the braking processing of the motor when the detent spring 22 reaches each of the plurality of valley portions.

The above embodiment shows an example in which the width W of the backlash Ba is a width W of a backlash Ba of the speed reducing mechanism 12a, but this disclosure is not limited thereto. In this disclosure, the width of the backlash may include a width of a backlash other than the speed reducing mechanism in the driving force transmission mechanism.

The above embodiment shows an example in which the shift device 100 disclosed here is applied to a shift device for an automobile, and this disclosure is not limited thereto. In this disclosure, the shift device may be applied to a shift device of a vehicle other than the automobile, such as an electric train.

The above embodiment shows an example in which the sine-wave three-phase AC voltages (the U phase, the V phase, and the W phase) are output by switching ON and OFF of the plurality of driving FETs 174 in the first inverter 173, but this disclosure is not limited thereto. In this disclosure, pulse-wave three-phase AC voltages (the U phase, the V phase, and the W phase) may be output by switching ON and OFF of the plurality of driving FETs in the first inverter.

The above embodiment shows an example in which the sine-wave three-phase AC voltages (the U phase, the V phase, and the W phase) are output by switching ON and OFF of the plurality of driving FETs 184 in the second inverter 183, but this disclosure is not limited thereto. In this disclosure, pulse-wave three-phase AC voltages (the U phase, the V phase, and the W phase) may be output by switching ON and OFF of the plurality of driving FETs in the second inverter.

For convenience of description, the above embodiment shows an example in which a control processing of the first MCU 171 (the first control unit) and the second MCU 181 (the second control unit) is described using a flow-driven type flowchart for sequentially executing a processing according to a processing flow, but this disclosure is not limited thereto. In this disclosure, the control processing of the first control unit and the second control unit may be executed by an event-driven type processing for executing a processing in event units. In this case, the processing may be executed in a completely event-driven type, or may be executed by combining the event-driven type and the flow-driven type.

A shift device according to one aspect of the disclosure includes: a shift switching member including a plurality of valley portions corresponding to shift positions; a motor including a rotor and a stator and configured to drive the shift switching member; a first drive system including a first inverter configured to output a voltage for driving the motor; a second drive system provided separately from the first drive system and including a second inverter configured to output a voltage for driving the motor; and a positioning member configured to be fitted into any one of the plurality of valley portions of the shift switching member to establish the corresponding shift position. When driving the motor, the shift position is switched by the voltages output from the first drive system and the second drive system.

In the shift device according to the above aspect of this disclosure, as described above, when driving the motor, the shift position is switched by the voltages output from the first drive system and the second drive system. Accordingly, when a failure is detected in either the first drive system or the second drive system during the shift switching, it is possible to take a measure (the fail-safe) of stopping the drive of the motor by the failure drive system while the drive of the motor by the normal drive system is continued, and thus the drive of the motor can be continued. As a result, when a failure is detected in either the first drive system or the second drive system during the shift switching, the drive control of the motor is not executed intermittently, and thus the drive control of the motor can be executed smoothly even if an abnormality is detected during the shift switching. In addition, by driving the motor using both the first drive system and the second drive system, power required for outputting a maximum torque of the motor can be distributed to each of the first drive system and the second drive system. Therefore, it is possible to prevent an increase in the size of each of the first drive system and the second drive system in comparison with a case where the maximum torque of the motor is output using either the first drive system or the second drive system.

In the shift device according to one aspect described above, preferably, when the positioning member reaches each of the plurality of valley portions, a leading one drive system of the first drive system and the second drive system, which determines first that the positioning member has reached each of the plurality of valley portions, does not execute a braking processing of the motor.

According to this configuration, before the other drive system, which is delayed in determining that the positioning member has reached each of the plurality of valley portions, determines that the positioning member has reached each of the plurality of valley portions, the leading one drive system can prevent the braking of the motor, and thus the drive of the motor by the other drive system can be prevented from being hindered.

In such a case, preferably, when the positioning member reaches each of the plurality of valley portions, the first inverter of the first drive system as the leading one drive system which determines first that the positioning member has reached each of the plurality of valley portions is turned off or the second inverter of the second drive system as the leading one drive system which determines first that the positioning member has reached each of the plurality of valley portions is turned off so as not to execute the braking processing of the motor.

According to this configuration, since the power is not supplied to the motor from the leading one drive system which determines first that the positioning member has reached each of the plurality of valley portions, the motor can be driven by only the other drive system which is delayed in determining that the positioning member has reached each of the plurality of valley portions. As a result, the motor can be driven as required by the other drive system which is delayed in the determination.

In the shift device in which the leading one drive system does not cause braking of the motor, preferably, when the positioning member reaches each of the plurality of valley portions, the leading one drive system, which determines first that the positioning member has reached each of the plurality of valley portions, does not cause braking for a predetermined time.

According to this configuration, since it is possible to secure, for a predetermined time, a time during which the motor can be driven as required by the other drive system which is delayed in determining that the positioning member has reached each of the plurality of valley portions, and thus, the other drive system that is delayed in the determination can also cause the positioning member to reliably reach each of the plurality of valley portions.

In the shift device in which the leading one drive system does not cause the braking for the predetermined time, preferably, the leading one drive system, which determines first that the positioning member has reached each of the plurality of valley portions, causes braking of the motor based on elapse of a predetermined time.

According to this configuration, the positioning member can be stopped near a valley bottom position of each of the plurality of valley portions learned in advance in the one drive system while ensuring a drive time of the motor by only the other drive system which is delayed in determining that the positioning member has reached each of the plurality of valley portions, so that a drive interference between the first drive system and the second drive system can be prevented, and the shift switching can be executed accurately.

In the shift device in which the leading one drive system does not cause braking of the motor, preferably, when the positioning member reaches each of the plurality of valley portions, the leading one drive system, which determines first that the positioning member has reached each of the plurality of valley portions, does not execute the braking processing of the motor, based on a difference between the shift position obtained in advance and a current position of the positioning member being within a position reaching determination range and a rotational speed of the motor being within a speed reaching determination range.

According to this configuration, since the positioning member can enter the position reaching determination range in a state where the motor is sufficiently decelerated so that the positioning member does not pass the shift position, it is possible to prevent the positioning member from passing the shift position due to the fact that the braking processing of the motor is not executed.

The shift device according to the above aspect may have the following configurations.

APPENDIX 1

That is, the first drive system as the leading one drive system causes braking of the motor by turning on a switching element on a lower arm side of the first inverter of the first drive system based on elapse of a predetermined time. Alternatively, the second drive system as the leading one drive system, which determines first that the positioning member has reached each of the plurality of valley portions, causes braking of the motor by turning on a switching element on a lower arm side of the second inverter based on elapse of a predetermined time.

According to this configuration, the leading one drive system which determines first that the positioning member has reached each of the plurality of valley portions can cause braking of the motor by a short brake, and thus the motor can be stopped quickly.

APPENDIX 2

The shift device according to one aspect described above further includes a driving force transmission mechanism that includes an output shaft connected to the shift switching member and that transmits a driving force from the motor to the shift switching member, a first motor rotation angle sensor and a second motor rotation angle sensor that measure a rotation angle of the motor, and a first output shaft sensor and a second output shaft sensor that measure a rotation angle of the output shaft. At the time of switching the shift positions, the motor is driven by the first drive system based on measurement values of the first motor rotation angle sensor and the first output shaft sensor, and the motor is driven by the second drive system based on measurement values of the second motor rotation angle sensor and the second output shaft sensor.

According to this configuration, each of the first drive system and the second drive system can independently perform control to drive the motor, so that even when one of the first drive system and the second drive system is abnormal, the drive control of the motor can be continued using the other drive system.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A shift device comprising:
a shift switching member including a plurality of valley portions corresponding to shift positions;
a motor including a rotor and a stator and configured to drive the shift switching member;
a first drive system including a first inverter configured to output a voltage for driving the motor;
a second drive system provided separately from the first drive system and including a second inverter configured to output a voltage for driving the motor; and
a positioning member configured to be fitted into any one of the plurality of valley portions of the shift switching member to establish the corresponding shift position, wherein when driving the motor, the shift position is switched by the voltages output from the first drive system and the second drive system, the first drive system and the second drive system are connected to different power supplies, and when a failure is detected in one of the first drive system and the second drive system during the shift switching, the drive of the motor by the one of the first drive system and the second drive system with the failure is stopped while the drive of the motor by the other of the first drive system and the second drive system is continued.

2. The shift device according to claim 1, wherein
when the positioning member reaches each of the plurality of valley portions, a leading one drive system of the first drive system and the second drive system, which determines first that the positioning member has reached each of the plurality of valley portions, is configured to perform control of freely driving the motor without causing a braking of the motor.

3. The shift device according to claim 2, wherein
when the positioning member reaches each of the plurality of valley portions, the first inverter of the first drive system as the leading one drive system which determines first that the positioning member has reached each of the plurality of valley portions is turned off or the second inverter of the second drive system as the leading one drive system which determines first that the positioning member has reached each of the plurality of valley portions is turned off so as not to execute the braking processing of the motor.

4. The shift device according to claim 2, wherein
when the positioning member reaches each of the plurality of valley portions, the leading one drive system, which determines first that the positioning member has reached each of the plurality of valley portions, does not cause braking for a predetermined time.

5. The shift device according to claim 4, wherein
the leading one drive system, which determines first that the positioning member has reached each of the plurality of valley portions, causes braking of the motor based on elapse of a predetermined time.

6. The shift device according to claim 2, wherein
when the positioning member reaches each of the plurality of valley portions, the leading one drive system, which determines first that the positioning member has reached each of the plurality of valley portions, does not execute the braking processing of the motor, based on a difference between the shift position obtained in advance and a current position of the positioning member being within a position reaching determination range and a rotational speed of the motor being within a speed reaching determination range.

7. A shift device comprising:
a shift switching member including a plurality of valley portions corresponding to shift positions;

a motor including a rotor and a stator and configured to drive the shift switching member;

a first drive system including a first inverter configured to output a voltage for driving the motor;

a second drive system provided separately from the first drive system and including a second inverter configured to output a voltage for driving the motor; and a positioning member configured to be fitted into any one of the plurality of valley portions of the shift switching member to establish the corresponding shift position, wherein when driving the motor, the shift position is switched by the voltages output from the first drive system and the second drive system, and when the positioning member reaches each of the plurality of valley portions, a leading one drive system of the first drive system and the second drive system, which determines first that the positioning member has reached each of the plurality of valley portions, does not execute a braking processing of the motor.

8. The shift device according to claim 7, wherein
when the positioning member reaches each of the plurality of valley portions, the first inverter of the first drive system as the leading one drive system which determines first that the positioning member has reached each of the plurality of valley portions is turned off or the second inverter of the second drive system as the leading one drive system which determines first that the positioning member has reached each of the plurality of valley portions is turned off so as not to execute the braking processing of the motor.

9. The shift device according to claim 7, wherein
when the positioning member reaches each of the plurality of valley portions, the leading one drive system, which determines first that the positioning member has reached each of the plurality of valley portions, does not cause braking for a predetermined time.

10. The shift device according to claim 9, wherein
the leading one drive system, which determines first that the positioning member has reached each of the plurality of valley portions, causes braking of the motor based on elapse of a predetermined time.

11. The shift device according to claim 7, wherein
when the positioning member reaches each of the plurality of valley portions, the leading one drive system, which determines first that the positioning member has reached each of the plurality of valley portions, does not execute the braking processing of the motor, based on a difference between the shift position obtained in advance and a current position of the positioning member being within a position reaching determination range and a rotational speed of the motor being within a speed reaching determination range.

* * * * *